C. H. ROPER.
PRODUCTION OF SHEETED RUBBER STOCK.
APPLICATION FILED OCT. 25, 1909. RENEWED MAY 20, 1912.
1,131,275. Patented Mar. 9, 1915.
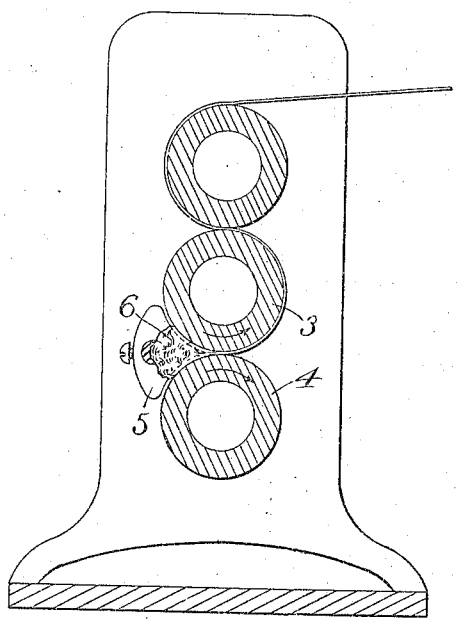
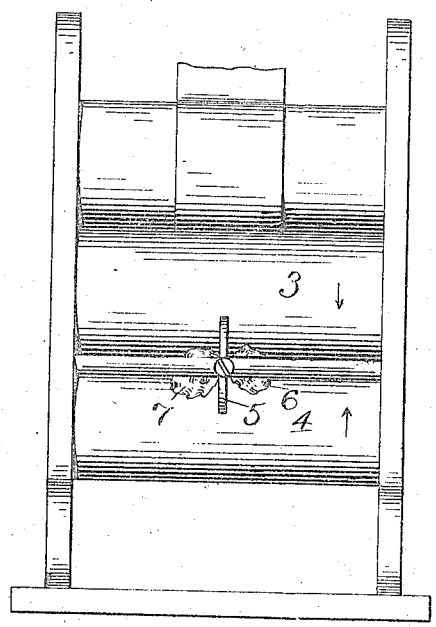

UNITED STATES PATENT OFFICE.

CHARLES H. ROPER, OF BELMONT, MASSACHUSETTS, ASSIGNOR TO HOOD RUBBER COMPANY, OF BOSTON, MASSACHUSETTS.

PRODUCTION OF SHEETED RUBBER STOCK.

1,131,275.

Specification of Letters Patent.

Patented Mar. 9, 1915.

Application filed October 25, 1909, Serial No. 524,512. Renewed May 20, 1912. Serial No. 698,630.

*To all whom it may concern:*

Be it known that I, CHARLES H. ROPER, citizen of the United States, residing at Belmont, Massachusetts, have invented certain new and useful Improvements in Production of Sheeted Rubber Stock, of which the following is a specification.

My present invention relates to improvements in the production of sheeted rubber stock or compound, such as used in the manufacture of rubber boots and shoes, and in fact rubber goods of various kinds, and comprises a new method of producing stock having portions of different characteristics such, for instance, as quality or color.

An apparatus suitable for carrying out my improved process is shown in the accompanying drawings in which, Figure 1 is a sectional elevation, and Fig. 2 is a front view.

According to my invention, I use a calender of ordinary or any desired form, as shown conventionally in the drawings, but at a suitable point in proximity to the two rolls 3 and 4, between which the gum is fed, I provide one or more partitions or dividing plates 5, which project in toward the bite of the rolls and conforms in shape to a portion of the periphery thereof. On one side of this plate is placed a mass or lump of rubber compound of one quality or color, as indicated in 6, and on the other side a similar lump of a different quality or color, as indicated at 7. By means of the partition the two bodies of rubber compound are kept separate and distinct until the bite of the rolls is reached, at which point they are pressed by the rollers into one single homogeneous sheet, one portion, however, of which is made up or composed of rubber of one quality or color while another portion is made up of rubber of another quality or color. The same result may be reached by using a wide partition at 5, or two partitions; pressing the stock through as two separate and distinct sheets and then passing, while warm, through two other rolls where they are pressed into one homogeneous sheet.

The advantages of my new process will be apparent by reference to one portion for example, of a rubber boot or shoe, to wit, the sole. As is well known certain portions of the soles of rubber boots and shoes wear much more rapidly than do other portions. Heretofore, as far as I am aware, it has been necessary in producing soles from rubber stock, to have the entire sole of a rubber of a uniform and necessarily high grade quality on account of the wear to which certain portions are subjected, and this on account of the amount of rubber used, entails considerable expense.

According to my present invention, I can run into the sheet at the points where the wear comes, a very high grade of rubber calculated to withstand the wear, while at other points I can use a much lower grade, the sole produced being a complete and homogeneous article and being capable of wearing fully as long as soles made entirely of high grade rubber, it being understood that the soles or like articles are cut from the sheet in such a manner that the portion or portions of the sheet of better wearing qualities are disposed in each article at the point or points which receive the greatest wear.

While I have shown in the drawings but one partition, it will be understood that as many of these might be used as the circumstances of the case require, thus producing as many variations in the quality or color of the different portions of the sheet as desired, and the width of these different portions may be varied by simply laterally adjusting the guide according to conditions.

It will be understood that by the term "sheeted rubber stock" I mean either sheets composed entirely of rubber compounds or sheets composed of rubber compounds frictioned or coated upon fabric, as to produce the frictioned or coated fabric it is only necessary to run in to the calender simultaneously with the feeding of the rubber, a continuous length of fabric.

Having thus described my invention, what I claim is:—

1. The herein described method of manufacturing articles of sheet rubber, having different wearing qualities which consists in simultaneously forming a plurality of sheets from a plurality of rubber stocks having different wearing qualities and uniting said sheets by pressure into a single integral sheet with the line or lines of juncture of the separate sheets in straight lines disposed longitudinally of the composite sheet, and subsequently cutting the articles from such sheet in such a manner that the portions of the sheet of better wearing qualities are disposed in each article at the point or points which receive the greatest wear.

2. The process of forming out-soles for rubber boots or shoes, consisting in passing two or more batches of rubber compound of different qualities through calender rolls at the same time so that the edge of one quality will over-lap and be forced into that of the other quality forming one homogeneous sheet and subsequently cutting the sheet into out-soles having one portion of a quality different from that of the other portion of the sole.

3. The process of forming outsoles for rubber boots or shoes consisting of passing two or more batches of rubber compound of different colors through calender rolls at the same time side by side so that the edge of one color will overlap and be forced into that of the other, forming one homogeneous sheet and subsequently cutting the sheet into out-soles having one portion of a color different from that of the rest of the outsole.

4. The process of forming outsoles for rubber boots or shoes consisting of passing two or more batches of rubber compound of different qualities and colors through calender rolls at the same time so that the edge of one quality and color will overlap and be forced into that of the other, forming one homogeneous sheet having different portions of different qualities and colors, and subsequently cutting the sheet into out-soles having one portion of a different quality and color than the other portion of the sole.

In testimony whereof, I affix my signature in presence of two witnesses.

CHARLES H. ROPER.

Witnesses:
 MYRON R. STEVENSON,
 EPHRAIM A. NICKERSON.